(12) United States Patent
Haglund et al.

(10) Patent No.: US 10,001,215 B2
(45) Date of Patent: Jun. 19, 2018

(54) METHODS AND DEVICES FOR CUTTING COMPOSITE MATERIAL AND SEALING DEVICES MADE OF COMPOSITE MATERIAL

(71) Applicants: Trelleborg Sealing Solutions Kalmar AB, Kalmar (SE); Trelleborg Sealing Solutions Germany GmbH, Stuttgart (DE)

(72) Inventors: Sven Haglund, Nybro (SE); Jonas Andersson, Kalmar (SE)

(73) Assignees: Trelleborg Sealing Solutions Kalmar AB, Kalmar (SE); Trelleborg Sealing Solutions Germany GmBH, Stuttgart (DE)

(*) Notice: Subject to any disclaimer, the term of this patent is extended or adjusted under 35 U.S.C. 154(b) by 0 days. days.

(21) Appl. No.: 14/384,761

(22) PCT Filed: Mar. 13, 2013

(86) PCT No.: PCT/EP2013/055148
§ 371 (c)(1),
(2) Date: Sep. 12, 2014

(87) PCT Pub. No.: WO2013/135770
PCT Pub. Date: Sep. 19, 2013

(65) Prior Publication Data
US 2015/0028547 A1    Jan. 29, 2015

Related U.S. Application Data

(60) Provisional application No. 61/610,022, filed on Mar. 13, 2012.

(30) Foreign Application Priority Data

Mar. 13, 2012    (SE) ........................................ 1250232

(51) Int. Cl.
| | | |
|---|---|---|
| B21D 28/16 | (2006.01) |
| F16J 15/08 | (2006.01) |
| B26F 1/44 | (2006.01) |
| F16J 15/12 | (2006.01) |
| B26D 3/08 | (2006.01) |

(Continued)

(52) U.S. Cl.
CPC .............. F16J 15/08 (2013.01); B21D 28/16 (2013.01); B26D 3/085 (2013.01); B26F 1/02 (2013.01);
(Continued)

(58) Field of Classification Search
CPC ........ F16J 15/121; F16J 15/12; F16J 15/0818; F16J 15/062; F16J 15/106; A61G 17/02; B21D 28/16; B26D 3/085
See application file for complete search history.

(56) References Cited

U.S. PATENT DOCUMENTS 3,269,735 A * 8/1966 Whittaker ............ F16J 15/0806
                                                            277/650
4,477,537 A    10/1984 Blase et al.
(Continued)

FOREIGN PATENT DOCUMENTS

DE    3242216 A1    5/1984
EP    0690252 A1    1/1996
(Continued)

*Primary Examiner* — Eugene G Byrd
(74) *Attorney, Agent, or Firm* — Pierce Atwood LLP; Kevin M. Farrell; David J. Wilson (57) ABSTRACT

Then invention relates to seals, methods for making seals and devices for making seals wherein the seals comprise a rigid substrate with two substantially parallel major surfaces (106, 108) wherein said surfaces are separated by a cut surface (110). The cut surface (110) comprises a first burnished region (119) of height p1 and a second burnished region (121) of height p2 wherein said first and second burnished regions are separated by a rough breakout (123) of height b.

8 Claims, 12 Drawing Sheets

(51) Int. Cl.
  *B26F 1/02* (2006.01)
  *B26D 3/00* (2006.01)
  *B26F 1/40* (2006.01)

(52) U.S. Cl.
  CPC ............ *B26F 1/44* (2013.01); *F16J 15/0818* (2013.01); *F16J 15/12* (2013.01); *F16J 15/122* (2013.01); *B26D 3/003* (2013.01); *B26F 1/40* (2013.01); *F16J 2015/0856* (2013.01); *Y10T 83/02* (2015.04)

(56) References Cited

U.S. PATENT DOCUMENTS

| | | | | |
|---|---|---|---|---|
| 7,464,575 | B2* | 12/2008 | Miyahara | B21D 28/02 |
| | | | | 72/329 |
| 2003/0133792 | A1* | 7/2003 | Vedantam | F04D 29/083 |
| | | | | 415/214.1 |
| 2009/0066035 | A1* | 3/2009 | Hurlbert | F02M 35/10078 |
| | | | | 277/592 |
| 2012/0225299 | A1* | 9/2012 | Takahashi | B05D 5/083 |
| | | | | 428/421 |
| 2015/0014946 | A1* | 1/2015 | Oohinata | B32B 15/046 |
| | | | | 277/654 |

FOREIGN PATENT DOCUMENTS

| | | | |
|---|---|---|---|
| EP | 1764194 | A1 | 3/2007 |
| GB | 1272523 | A | 5/1972 |
| JP | 57184617 | | 11/1982 |
| JP | 3430358 | B2 | 7/2003 |
| WO | 8501241 | | 3/1985 |

\* cited by examiner

PRIOR ART

Fig. 2a)

PRIOR ART

PRIOR ART

PRIOR ART

METHODS AND DEVICES FOR CUTTING COMPOSITE MATERIAL AND SEALING DEVICES MADE OF COMPOSITE MATERIAL

FIELD OF THE INVENTION

The present invention relates to sealing devices made from composite materials, composite materials suitable for use in such sealing devices, and methods and apparatus for making sealing devices from said composite materials.

BACKGROUND OF THE INVENTION

Sealing devices such as sealing rings and sealing strips are used in many applications to provide gas- and liquid-tight seals between mating surfaces. In applications such as seals between the mating surfaces of a lid and an opening, at least one of the mating surfaces is usually provided with a positioning groove, shoulder or flat region intended to receive a sealing device in the form of a loop or ring or strip of resilient sealing material. In the specific case of a single positioning groove or shoulder the sealing device is dimensioned so that before the mating surfaces are brought together it can extend above the sides of the positioning groove, and after the two mating surfaces are correctly positioned and brought together it is in contact with both mating surfaces and exerts a sealing force against them. As resilient sealing devices can only change shape but normally cannot change volume by any significant amount the dimensions of the sealing device has to be carefully matched to the dimensions of the groove and obviously the volume of the sealing device has to be smaller than the volume of the groove it is intended to be used in. In the case of two positioning grooves where one groove is provided in each of the opposing mating surfaces, the total height of the sealing device is normally greater than the combined depths of the two positioning grooves. Current sealing devices are usually made of elastomer material and in order to function as seals have to flexible and preferably soft (i.e. they are made of material with a low Young's modulus). Fitting large sealing devices which are highly flexible into grooves is difficult to automate as the sealing devices have the rigidity of well-cooked spaghetti and thus tend to droop out of shape. This means that they often need to be fitted manually.

Figure 1A:
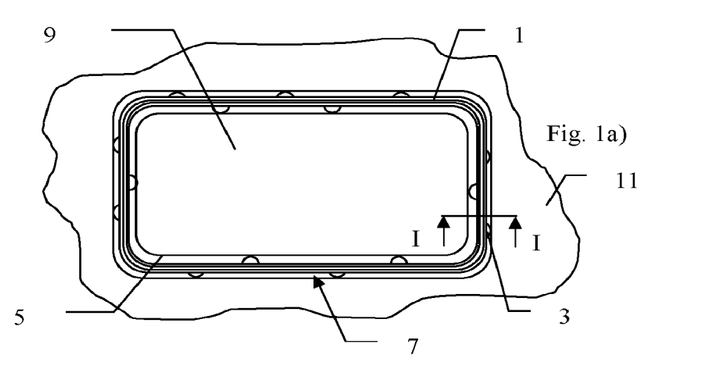
FIG. 1a) shows in plan view an example of a prior art resilient sealing device and FIG. 1b) shows a magnified cross-section through lines I-I on FIG. 1a).
Figure 1B:
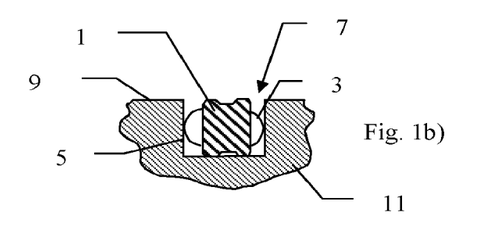

It can be easy to fit and retain resilient sealing devices (particularly when the devices have a circumference less than about 30 cm) in grooves with only concave bends (e.g. circular grooves) while the components are being handled or transported, but in more complex shaped grooves which include convex bends it can be difficult to correctly position and retain the sealing device in the groove as its flexibility allows it to take up unwanted orientations (for example it will tend to contact the inner radius of a bend instead of laying in the middle of the groove) and/or to stretch unevenly (thus, for example, becoming undesirably thinner in the region of a bend) or even to fall out of the groove. In order to overcome these problems, a sealing device 1 can be provided with regularly spaced lateral projections 3 which can grip the wall 5 of the groove 7 formed in the mating surface 9 of a component 11 and thereby hold the device in place as is shown in FIGS. 1a) and 1b). Such lateral projections increase the cost of the sealing devices but do not solve the problem of how to easily and reliably fit the flexible sealing devices in the grooves as such projections do not add significantly to the rigidity of the sealing device.

In order to overcome the above mentioned problems it is known to provide seals in the form of gaskets made from substrates in the form of sheets of thin rigid material, for example a metal or composite material, provided with resilient material, for example a rubber, on one or more faces. Usually the resilient material is provided on two opposing faces. An example of such a gasket for use as a cylinder head seal in internal combustion engines is known from EP690252. It is taught in this patent that a gasket can be formed by cutting the desired shape out of a sheet of composite material comprising a reinforcing electro-galvanised metal sheet positioned between two layers of elastomer. Cutting takes place between two rotating blades. A problem which arises when cutting sheet metal in this method is that it is a slow process, limited by the speed of rotation of the blades, which means that the cost of the final gasket is high.

Figure 2A:
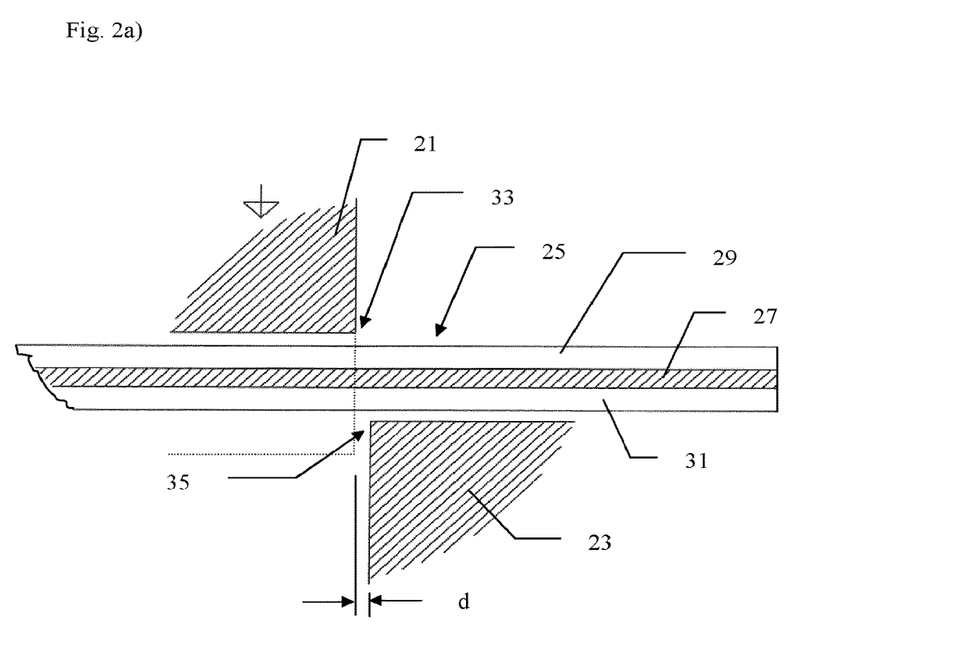
FIG. 2 shows schematically a cross-section through a prior art die cutting arrangement in which a plate of material is cut using a single cutting surface and a cross-section through the resulting product.

GB1272523 relates to method for producing rigid gaskets or sealing rings comprising a metal stock layer with either one or two gasket stock layers. The metal stock layer is normally a flat plate of metal which has two parallel major surfaces which are separated by the thickness of the plate. The gasket stock layer material comprises a sheet of rubber with two major surfaces separated by the thickness of the rubber. The patent describes two basic approaches for fabricating gaskets. The first method is to join the metal and gasket material together with a major surfaces of the metal plate and rubber sheets in contact, and to die cut them as a unit. In die cutting the component which is to be cut out is placed between a punch and a die. The desired shape of the component is achieved by the edges of the punch and die passing each other. Usually the die has an opening which is larger than the punch to allow smooth entry of the punch into it. The second method is to die cut the metal and the gasket material separately and then join them together. A problem with the first method is that it not possible to accurately control the width or diameter of the resulting gasket. This is because die cutting leaves broken surfaces as the cutting proceeds through the material and tends to cause the composite material to become bowed or warped, i.e. the major surfaces of the gasket are no longer in straight parallel planes. This can be seen in FIGS. 2-4 which shows simple die cutting as known in the prior art. FIG. 2a) shows schematically a punch 21 and a die 23 used to cut thorough a piece of composite material 25—the parent stock 22—in order to form a part 24. Composite material 25 is made out of a substrate 27 of rigid sheet material coated on both major sides with respectively an upper sheet 29 and a lower sheet 31 of resilient material. Punch 21 has a cutting edge 33 which can move vertically as shown by an arrow. Die 23 has a cutting edge 35 which is offset a distance d from the path that punch cutting edge 33 follows. Distance d is the cutting clearance. Cutting of composite material 25 is achieved by moving the punch 21 to the position shown by dotted lines. In this position the punch cutting edge 33 has passed parallel to, but at distance d from, die cutting perimeter 35 thereby separating the part 24 from the parent stock 22.

Figure 2B:
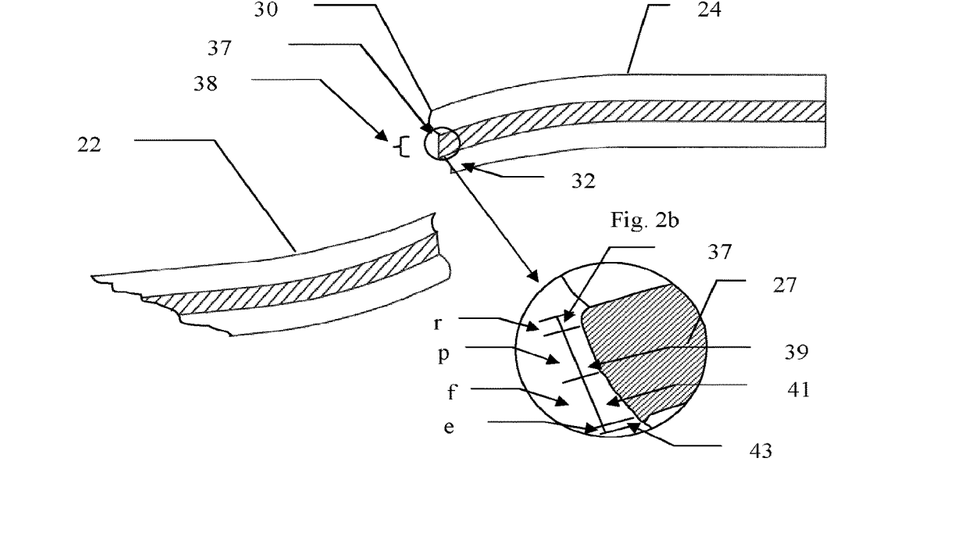

FIG. 2b) shows schematically a typical cross-section through the part 24 of composite material which has been cut by such a punch and die. The cut edge 30 of upper layer 29 of resilient material has a convex cross-section caused by some of the resilient material being stretched and dragged down by the flat face of the punch surrounding the punch cutting edge before fracturing. The cut edge 32 of lower layer has a concave cross-section. The cut edge of substrate 27 of rigid material is bend downwards due to it being plastically deformed before being penetrated and fracturing. As can be seen in the enlarged view of FIG. 2b), the cut edge 38 of the rigid substrate 27 exhibits an upper region 37 of edge rollover of height "r" where plastic deformation took place, a shiny smooth or burnished middle region 39 of height "p" where penetration took place, a rougher lower region 41 of height "f" when the material fractured and it may also have a burr edge 43 of height "e".

Figure 3A:
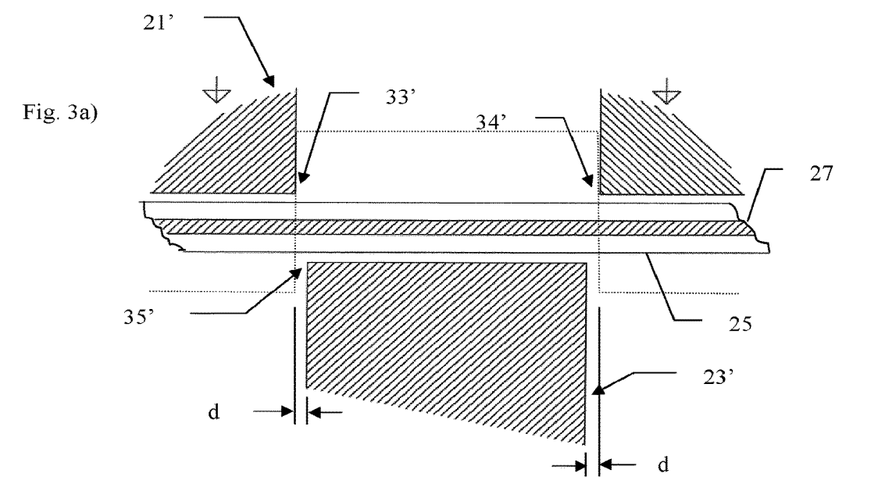
FIGS. 3a)-3b) shows schematically a cross-section through a prior art die cutting arrangement in which a piece of material is cut out of a plate of material using a pair of spaced-apart cutting surfaces, and a cross-section through the resulting product.

FIG. 3a) shows schematically a punch 21' and a die 23' used to cut a strip through a piece of composite material 25. Punch 21 has two cutting edges 33', 34' which together can move vertically as shown by arrows. Die 23 has a cutting perimeter 35' which is offset the cutting clearance distance d from the path that each punch cutting edge 33', 34' follow. Cutting of composite material 25 is achieved by moving punch to the position shown by dotted lines. In this position the punch cutting edges 33', 34' have passed parallel to, but at distance d from, die cutting edge 35'.

Figure 3B:
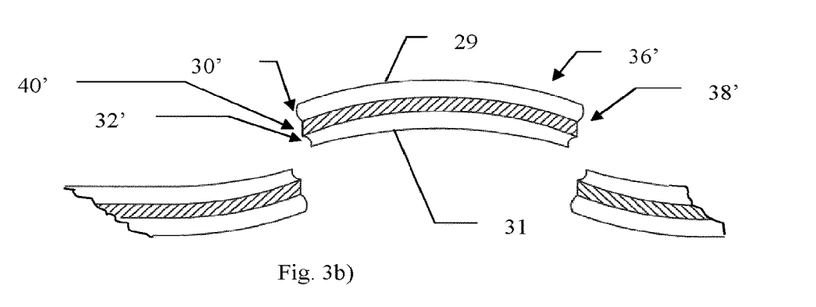

FIG. 3b) shows schematically a typical cross-section through a piece of composite material which has been cut by such a punch and die. The resulting disk 36' is not flat but is domed. The cut edge 30' of upper layer 29 of resilient material has a convex cross-section caused by some of the resilient material being stretched and dragged down by the punch cutting edge before fracturing, the cut edge 38 of substrate 27 of rigid material is bend downwards due to it being plastically deformed before being penetrated and fracturing and the cut edge 32' of lower layer 31 has a concave cross-section due to it being ripped by the descending cutting edge. The cut edges 38', 40' of the substrate each exhibit an upper region of rollover where plastic deformation took place, a shiny smooth burnished middle region where penetration took place, a rougher lower region when the material fractured and they may also have a burr edge.

Figure 4A:
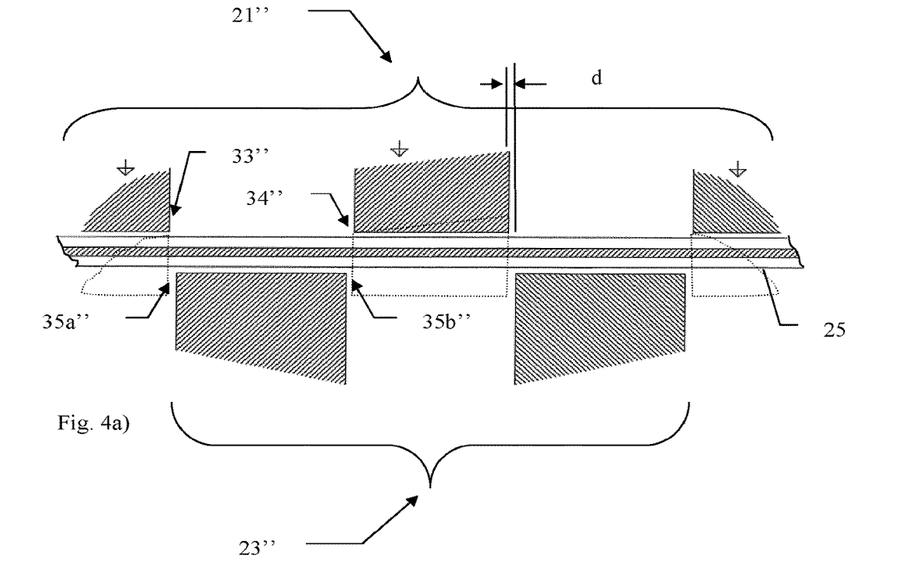
FIGS. 4a)-4b) shows schematically a cross-section through a prior art die cutting arrangement in which a ring of material is cut out of a plate of material using a center hole-cutting and a perimeter-cutting die, and a cross-section through the resulting product.

FIG. 4a) shows schematically a punch 21" and a die 23" used to cut through a piece of composite material 25 to form an annular piece such as a washer. Punch 21" has outer diameter cutting edge 33" and inner diameter cutting edge 34" which together can move vertically as shown by arrows. Die 23 has an outer cutting edge 35a" and an inner cutting edge 35b" which each are offset the cutting clearance distance d from the path that the punch cutting edge 33" respectively, 34' follow. Cutting of composite material 25 is achieved by moving the punch to the position shown by dotted lines. In this position the punch cutting edges 33", 34" have passed parallel to, but at distance d from, die cutting edges 35a" and 35b".

Figure 4B:
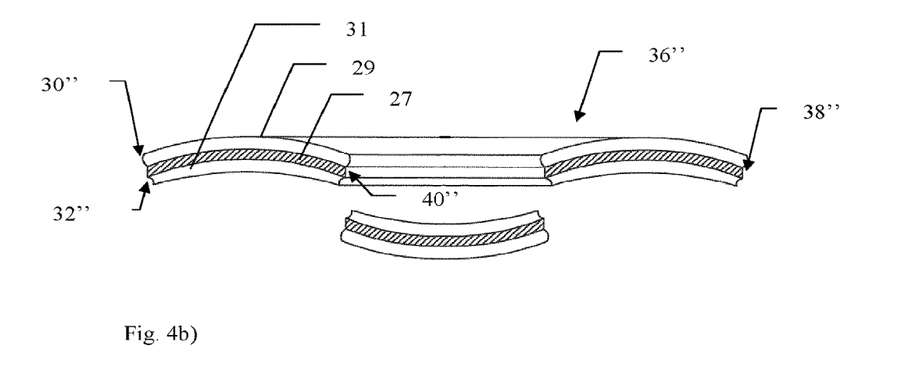

FIG. 4b) shows schematically a typical cross-section through a piece of composite material which has been cut by such a punch and die. The resulting washer 36" is not flat but is bowed. The cut edges 30" of upper layer 29 of resilient material has a concave cross-section caused by some of the resilient material being stretched and dragged down by the punch cutting edge before fracturing, while the substrate 27 of rigid material is bend downwards due to it being plastically deformed before being penetrated and fracturing and the cut edges 32" of lower layer 31 of resilient material has a concave cross-section due to it been ripped by the descending cutting edge. The cut edges 38", 40" of the substrate each exhibit an upper region of edge rollover where plastic deformation took place, a shiny smooth middle region where penetration took place, a rougher lower region where the substrate material fractured and they may also have a burr edge.

Bowed gaskets formed as a unit by means of die stamping are unacceptable to the modern manufacturing industry in which manufacturing tolerances are continuously becoming tighter. The second method described in GB1272523 is expensive as each component is cut separately and then has to be assembled into a unit. This requires alignment and adhesion steps which are time-consuming and expensive. Additionally such rigid gaskets and sealing devices are more expensive to store and transport compared to flexible sealing devices due to the large areas enclosed within the perimeter of the gasket.

BRIEF DESCRIPTION OF THE INVENTION

In one embodiment of the invention a method of providing a sealing device comprises the steps of stamping a rigid plate provided with a resilient coating on one or both of its major surfaces wherein the stamping is performed using two opposed punches which have edges which are substantially aligned with each other and which both penetrate the rigid plate but do not meet.

In another embodiment of the invention a method of providing a sealing device comprises the steps of stamping a rigid plate provided with a resilient coating on one or both of its major surfaces wherein the stamping is performed using two opposed punches which have edges which are substantially aligned with each other and which edges penetrate substantially simultaneously the rigid plate but which do not meet or overlap.

DETAILED DESCRIPTION OF THE INVENTION

Figure 5A:
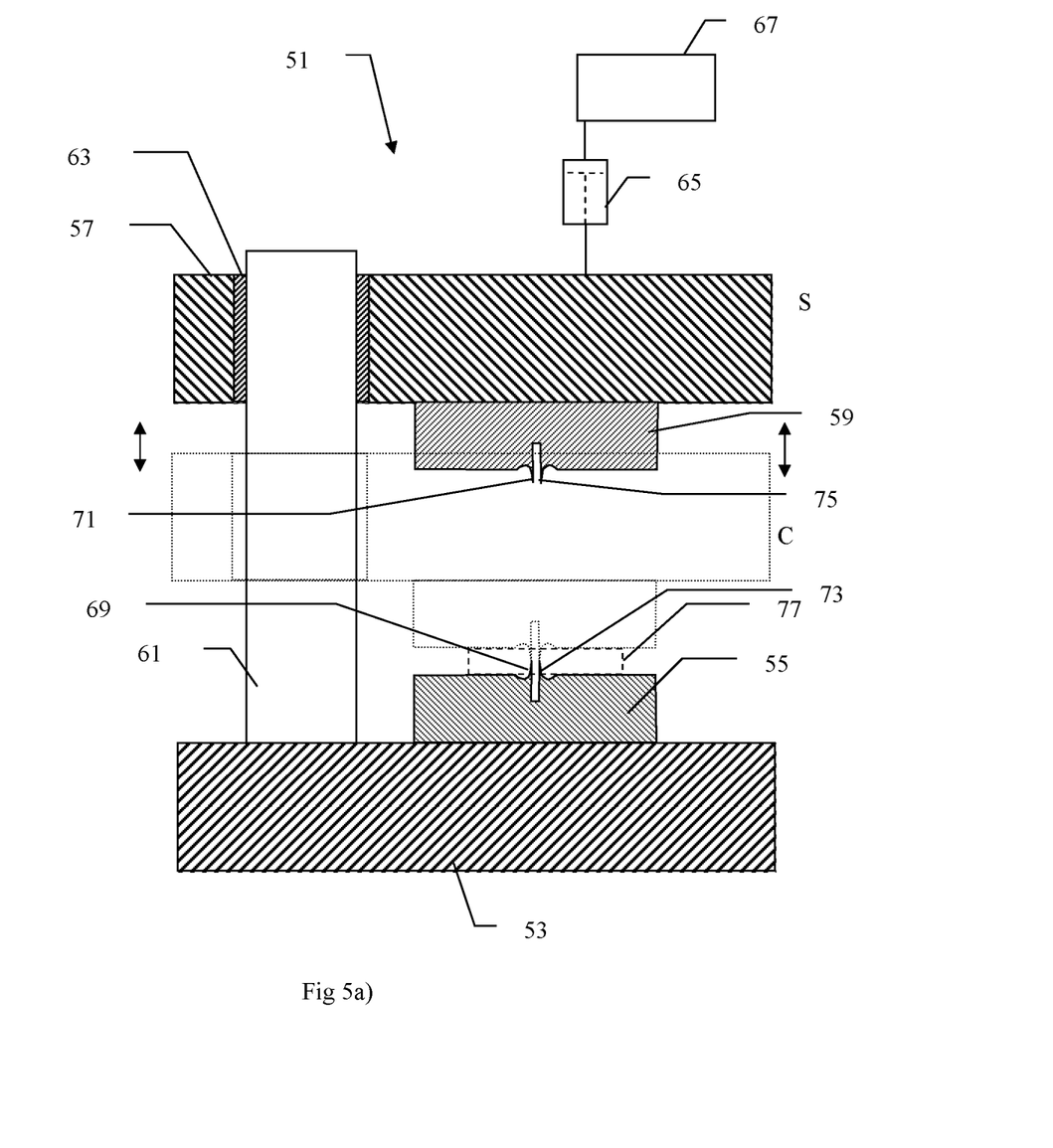
FIGS. 5a) to 5l) shows schematically cross-sections through a stamping arrangement in the steps of a first method in accordance with the present invention in which a piece of composite material is cut out of a plate of composite material using a pair of opposed punches, and cross-sections through the resulting product.
Figure 5B:
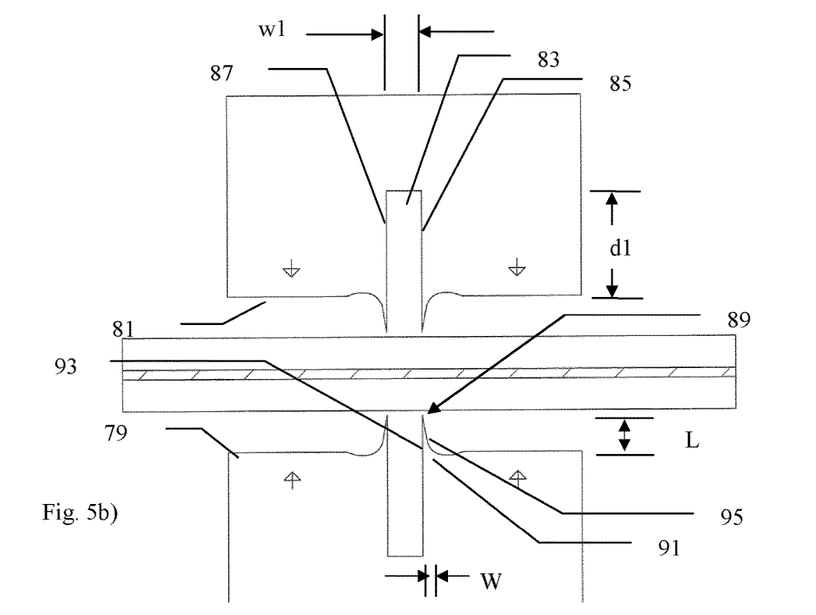

FIGS. 5a)-5l) show steps in an embodiment of a method according to the present invention for producing a sealing device out of composite material. In a method according to the present invention material made out of a substrate of rigid material coated with two sides of resilient material is cut by using two opposed cutting tools thereby cutting the material without warping the rigid material substrate and at the same time achieving two straight cut edges on the substrate material. In the method according to the invention the size, shape, alignment and movement of the cutting edges of the opposed cutting tools are arranged so that the cutting edges:

are substantially mirror images of each other;

are arranged to be opposite to one another; and are able to be moved towards each other but not past each other during a cutting operation.

This can be achieved by both cutting tools moving towards each other or, preferably, by one cutting tool being maintained in a fixed position and the other cutting tool being moved towards it.

Preferably the movement of the cutting edges towards each other is arrested when their tips are 0.2 mm apart, more preferably when they are 0.03 mm apart and most preferably 0.01 mm. Owing to the cutting taking place from both sides with preferably substantially equal penetration from each side, the rigid material remains flat with its major surfaces in flat planes which are parallel to each other.

FIG. 5a) shows schematically a stamping machine 51 for use in a method according to the present invention. Only elements necessary to explain the general working of the invention are shown. Stamping machine 51 comprises a first die shoe 53 which supports a first cutting tool 55 and a second die shoe 57 which supports a second cutting tool 59. First die shoe 53 supports a guide pillar 61 which cooperates with a guide bush 63 in second die shoe 57 to ensure that the movement of the die shoes towards each other is accurately controlled. Actuating means 65 such as a screw, actuating cylinder, cam, etc. of the type well-known to the person skilled in the art of stamping and punching are connected to second die shoe in order to move it towards and away from first die shoe. Movement of the second die shoe is controlled by mechanical, electrical, electronic, or the like controlling means 67 of the type well-known to the skilled person. First cutting tool 55 has a first cutting blade 69 which during use faces towards and is aligned with a first cutting blade 71 on second cutting tool 59. The shape of the circumference of first cutting blade 69 on first cutting tool 55 is substantially a mirror-image of the shape of the circumference of the first cutting blade 71 on second cutting tool 59. First cutting tool 55 has a second cutting blade 73, preferably arranged substantially parallel to first cutting blade 69. The distance between first and second cutting blades determines the width of the subsequent stamped-out component. In the event that the stamped-out component is required to have local variations in its width, for example to provide locating lugs, then the cutting blades will not be parallel at these locations, but preferably will be substantially parallel everywhere else. Second cutting blade 73 during use faces towards and is aligned with second cutting blade 75 on second cutting tool 59. The shape of the circumference of second cutting blade 73 on first cutting tool 55 is substantially a mirror-image of the shape of the circumference of opposing second cutting blade 75 on second cutting tool 59. This means that when the first and second cutting tools perform a cutting action the shape of the cut made by the first cutting tool in one side of a blank is substantially exactly mirrored by, and aligned with, the shape of the cut made by the second cutting tool in the opposite side of the blank.

The blank of sealing material 77 which is to be cut is, as showed by dashed lines in FIG. 5a), positioned between the first and second cutting tools 55, 59. In this example the sealing material 77 is made out of a substrate 27' of rigid sheet material coated on both major sides with respectively first sheet 29' and a second sheet 31' of resilient material. Preferably the rigid material is from 0.1 to 5 mm thick and each sheets of resilient material is from 0.1 to 10 mm thick. The Young's modulus of the rigid material is at least 10 times the Young's modulus of the resilient material, preferably at least 100 times the Young's modulus of the resilient material and most preferably at least 1000 times the Young's modulus of the resilient material. A sheet of sealing material 77 can be made by attaching sheets of rubber or other resilient material to one or both major surfaces of a sheet of metal or other rigid material. For example in order to make a sheet of sealing material with a resilient layer on each side of a sheet of metal, the sheet of metal may first be pre-treated chemically to remove any contaminants and to prepare the surface to receive an adhesive. The major surfaces may also be pre-treated mechanically, e.g. by brushing, in order to provide a roughened surface which improves adhesion to them. These pre-treated surfaces are then coated with an adhesive or bonding agent. A resilient layer is then applied to each of the surfaces and contact surfaces of the metal and resilient layers bonded together. Resilient layers can be applied and bonded by, for example, using a daylight press, rotor curing, compression moulding, injection moulding, extrusion, screen printing or the like. The resilient material may be vulcanised, non-vulcanised, a latex product or a solvent-based product. In the event that the rigid material is not a metal then the chemical and/or mechanical pre-treatment should be adapted to take into account the properties of the rigid material and the material which will be bonded to it.

During a cutting cycle second die shoe 57 and second cutting tool 59 are moved by actuating means from a starting position S shown in solid lines to the cutting position C showed in dotted lines before returning to the starting position. In cutting position C the first cutting blades 69, 71 are aligned with each other and in proximity to each other but not in contact with each other and second cutting blades 73, 75 are aligned with each other and in proximity to each other but not in contact with each other.

Figure 5C:
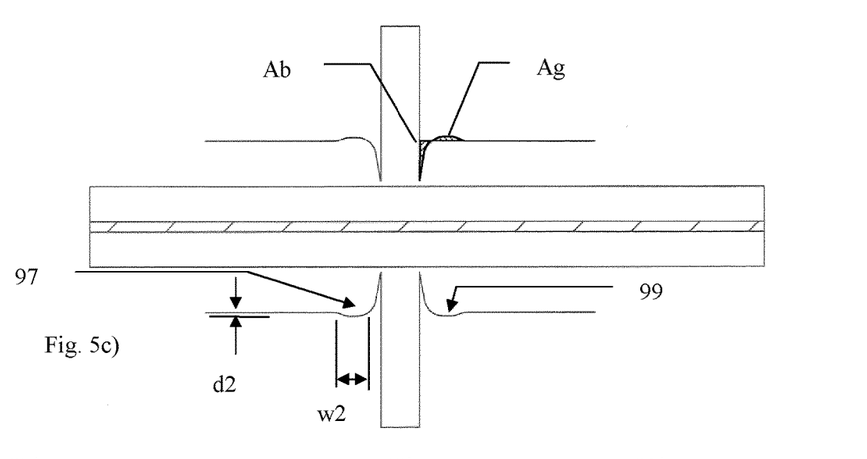
Figure 5D:
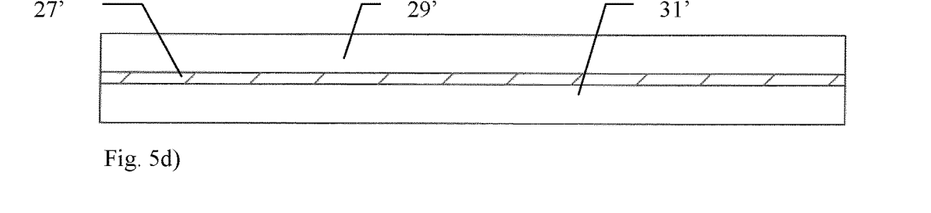

FIG. 5b-5j) show schematically the relative positions of only portions of the cutting tools and material that is being cut in during steps of a cutting cycle in accordance with the present invention to form a strip of cut material. As in this embodiment of the invention the material which is to be cut has substantially equal thicknesses of resilient material on the two major sides of the rigid material, for the sake of brevity only first cutting tool will be described in detail as the cross-sectional profile of the second cutting tool is substantially a mirror-image of the cross-sectional profile of first cutting tool. First and second cutting tools 55, 59 each have a cutting blade receiving face 79, 81 and during use the cutting blade receiving face of first and second cutting tools face towards each other. Each cutting blade 69, 71, 73, 75 may be formed directly in its respective cutting blade receiving face 79, 81 or may be mounted in it. Each cutting blade receiving face has a relief groove 83 of width w1 and depth d1 formed in it. Preferably the side walls 85, 87 of the relief groove are parallel with each other and orthogonal to the cutting blade receiving face. Relief grooves prevent compression forces arising on the piece part being formed. Each cutting blade has a profile which extends from a sharp tip 89 to a wider base 91 and has a substantially flat inner face 93 aligned with the closest side wall of the relief groove 83 and extending a distance L orthogonally away from the cutting blade receiving face. The outer face 95 of each cutting blade slopes outwards from the sharp tip and the cutting blade has a width W where the base 91 of the cutting blade meets the plane of the cutting blade receiving face 79. As shown in FIG. 5c), preferably a material-receiving groove 97 with a concave curved surface 99 of width w2 and maximum depth d2 is formed in the cutting blade receiving face adjacent to the base of the cutting blade. Preferably the cross-sectional area Ag of the material-receiving groove is more than 50% of the cross-sectional area Ab of the adjacent cutting blade, more preferably it is the same as cross-sectional area Ab, or even more preferably it is greater than cross-sectional area Ab and is intended to receive material, especially the resilient material, temporarily displaced by the cutting blade during a cutting operation.

In the event that the thicknesses of the resilient layers are different (and in the case where there is only one resilient layer) then it would be appropriate to adjust the cross-sectional profiles of the first and second cuttings tools such that the cutting tool which faces the thickest layer of resilient material has a blade which extends a distance L from the cutting blade receiving face which is greater than that of the blade of the other cutting tool.

FIGS. 5a) to 5d) show schematically the state of the composite material that is intended to be cut before the punches have been brought into contact with it.

Figure 5E:
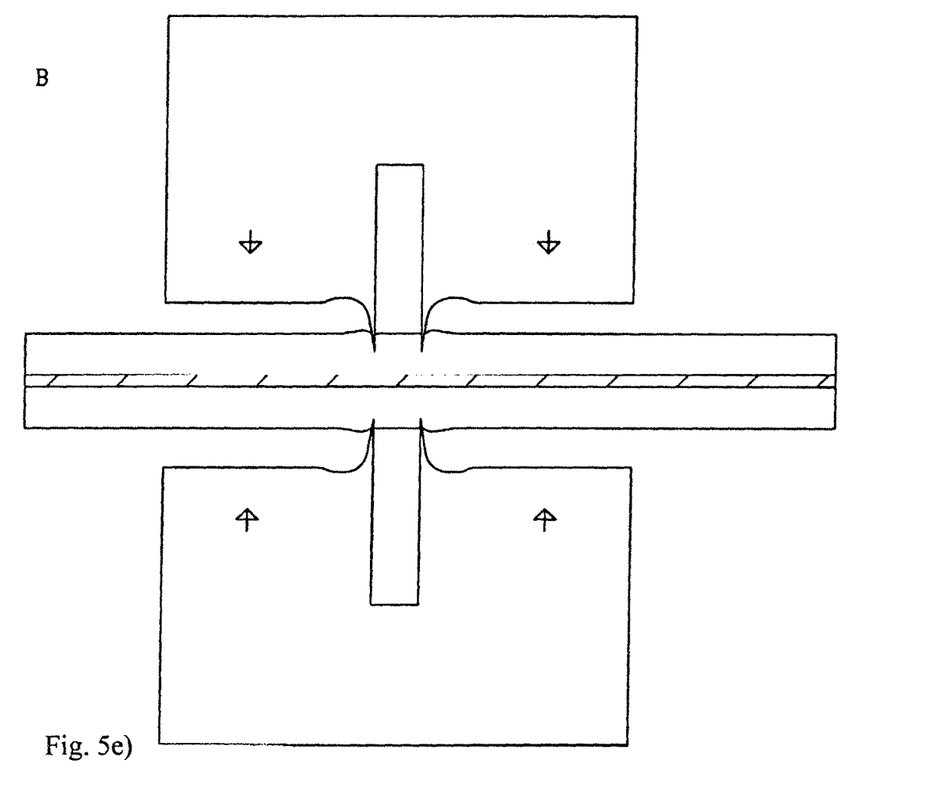
Figure 5F:
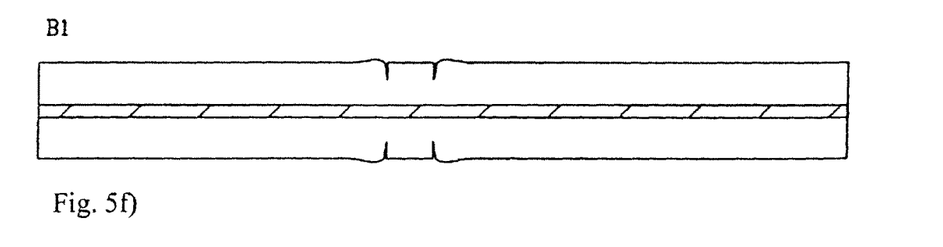

FIGS. 5e) and 5f) show schematically the two punches initially penetrating the resilient layers of the composite material and how these resilient 29', 31' layers are cut and displaced by the profiles of the cutting blades. The flat inner faces 93 of the cutting edges have formed a straight cut in the direction of movement of the punch in the resilient material that is in contact with the flat faces 93 of the cutting edges, while the opposite, curved face of each cutting blade has displaced first laterally and subsequently obliquely, the resilient material that it is in contact with. This displaced resilient material temporarily forms a ridge R in the exposed surface of the resilient material.

Figure 5G:
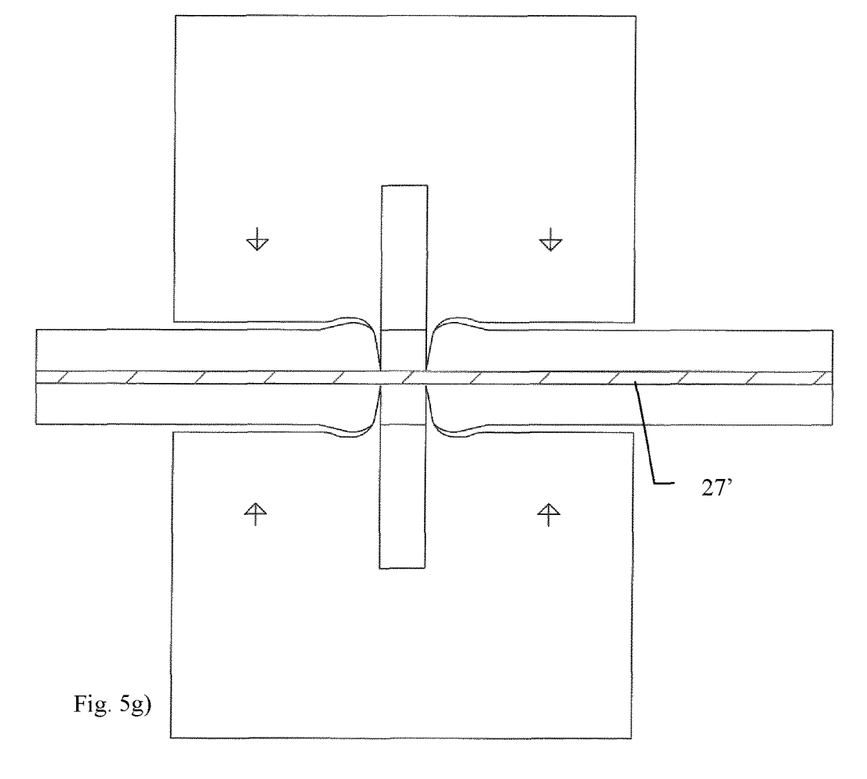
Figure 5H:
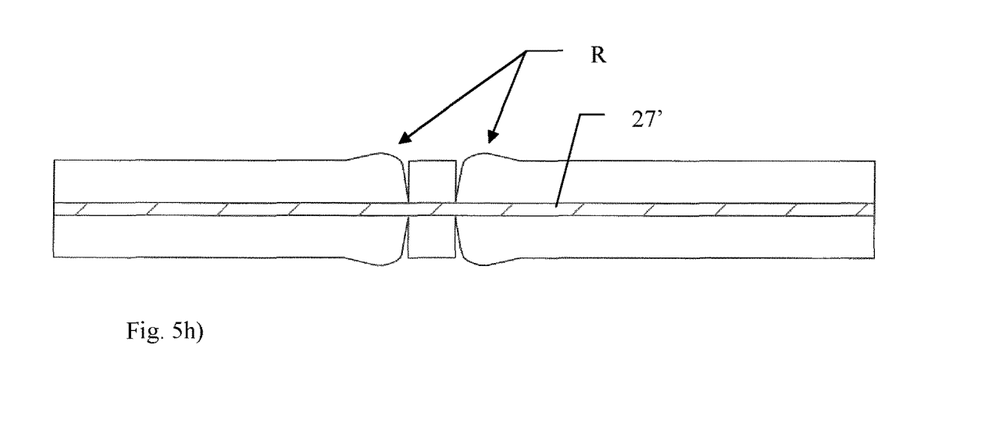

FIGS. 5g) and 5h) show schematically the punches penetrating the resilient material until they are just about to contact the rigid material 27'. The cutting blade receiving faces of the punches are not yet in contact with the resilient material which on the curved sides of the cutting blades exhibits an increasingly pronounced ridge R due to the increasing volume of resilient material displaced by the curved faces of the cutting blades.

Figure 5I:
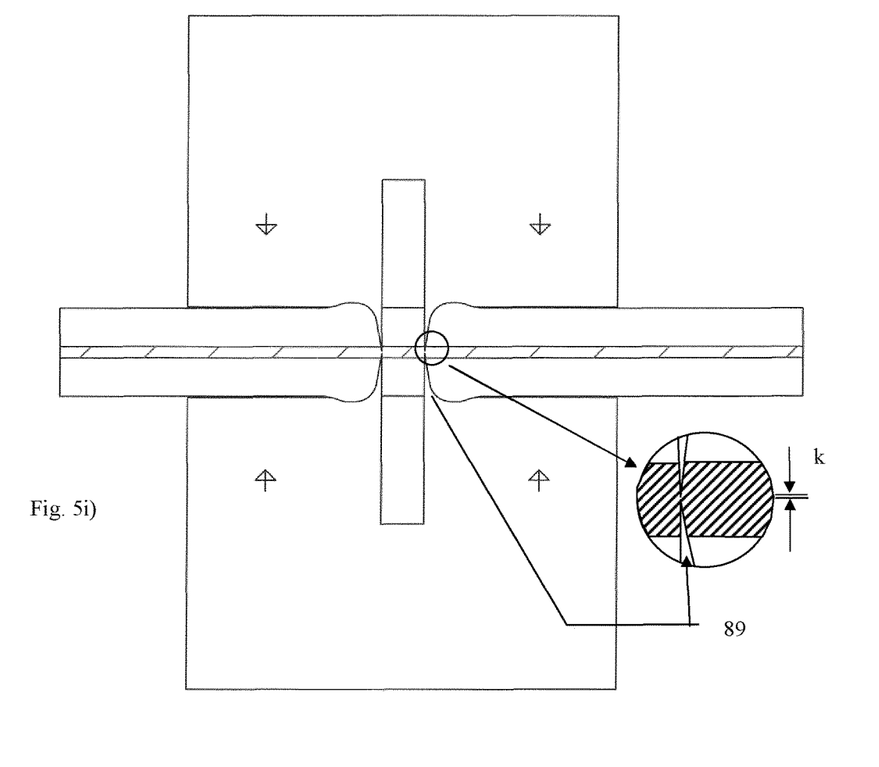
Figure 5J:
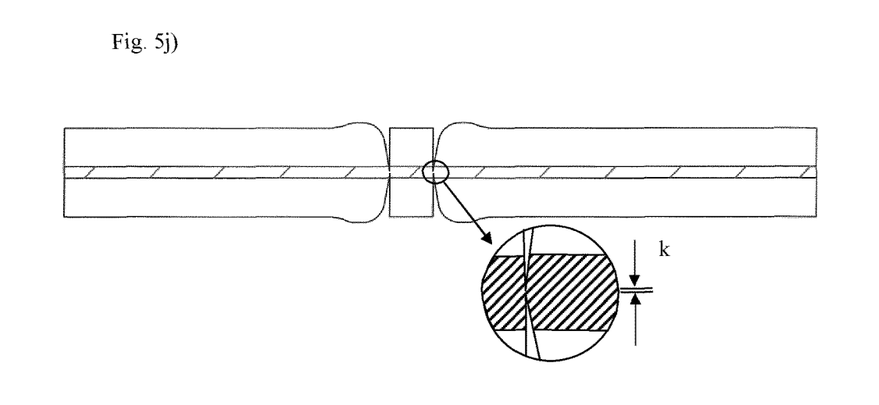

FIGS. 5i) to 5l) show schematically the punches penetrating to the end of the stamping stroke where the sharp tips of the cutting blades of the opposed punches are closest together. The cutting blade receiving face 79 of the first cutting tool 55 has come into contact with the exposed surface of the first resilient layer 31' and the cutting blade receiving face 81 of the second cutting tool 59 has come into contact with the exposed surface of the second resilient layer 29'. The tips 89 of the cutting blades are separated by a kissing distance k. Preferably distance k is chosen so that the rigid material fractures across this distance k during the stamping stroke or during handling following the stamping stroke. Kissing distance k is preferably less than 0.2 mm, more preferably less than 0.03 mm and most preferably 0.01 mm. Each of the flat inner faces 93 of the cutting edges have formed a straight cut in the resilient material. Each cut extends in the direction of movement of the punch and penetrates the rigid material. Preferably when the properties of the rigid material are homogenous throughout its depth, the cuts penetrate from each side symmetrically to the same depth into the rigid material as this minimises the risk that the material will become warped. The opposite, curved face of each cutting blade has temporarily displaced sideways the resilient material that it is in contact with, as shown in FIG. 5j). This displaced material forms a temporary ridge in the surface of the resilient material and is accommodated in the material-receiving grooves in each punch.

Figure 5K:
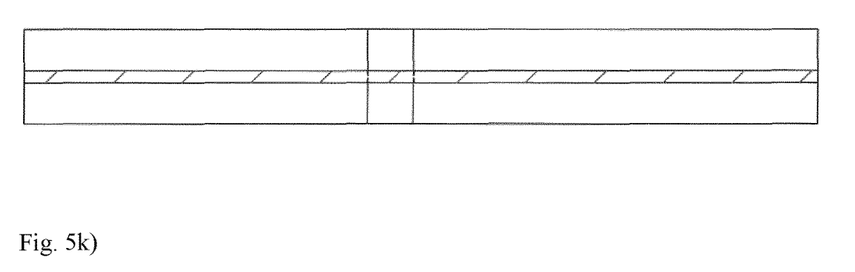
Figure 5L:
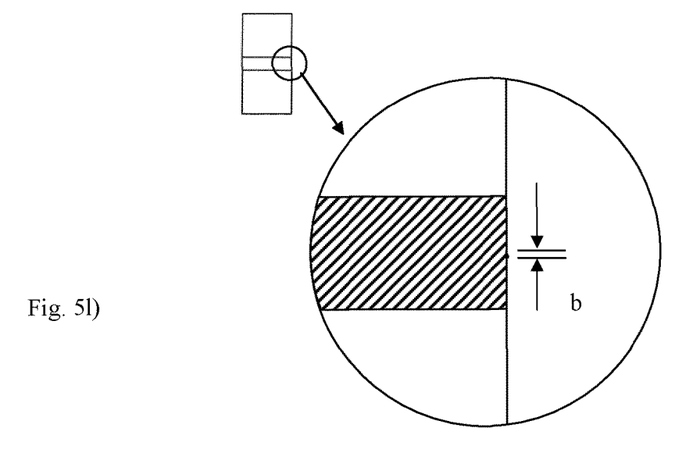

As the cutting of the rigid material has been performed by sharp, tapered blades instead of by shearing between two blunt surfaces, the cut surfaces of the rigid material of the piece part in contact with the cutting blades closely match the flat surfaces of the cutting blades and each cut face of the rigid material exhibits two smooth burnishes separated by a rough breakout. As shown in FIG. 5k)-5l), the breakout has a height b which is approximately equal to the kissing distance k where the material has been fractured instead of being cut.

Figure 6A:
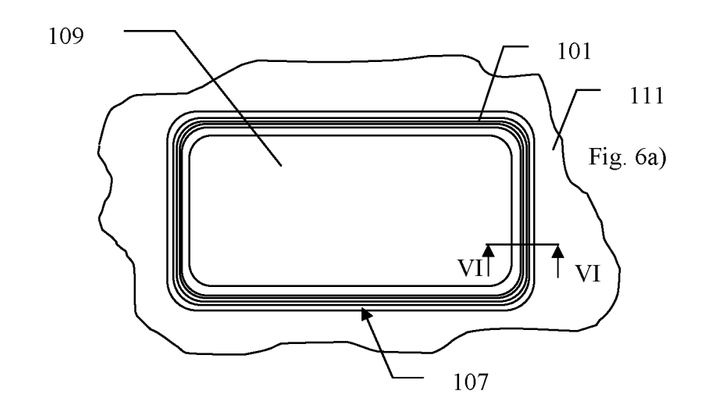
FIG. 6a) shows in plan view a resilient sealing device in accordance with an example of the present invention, FIG. 6b) shows a magnified cross-section through lines VI-VI on FIG. 6a) and FIG. 6c) shows a close-up of part of the cross-section of FIG. 6b).
Figures 6B, 6C:
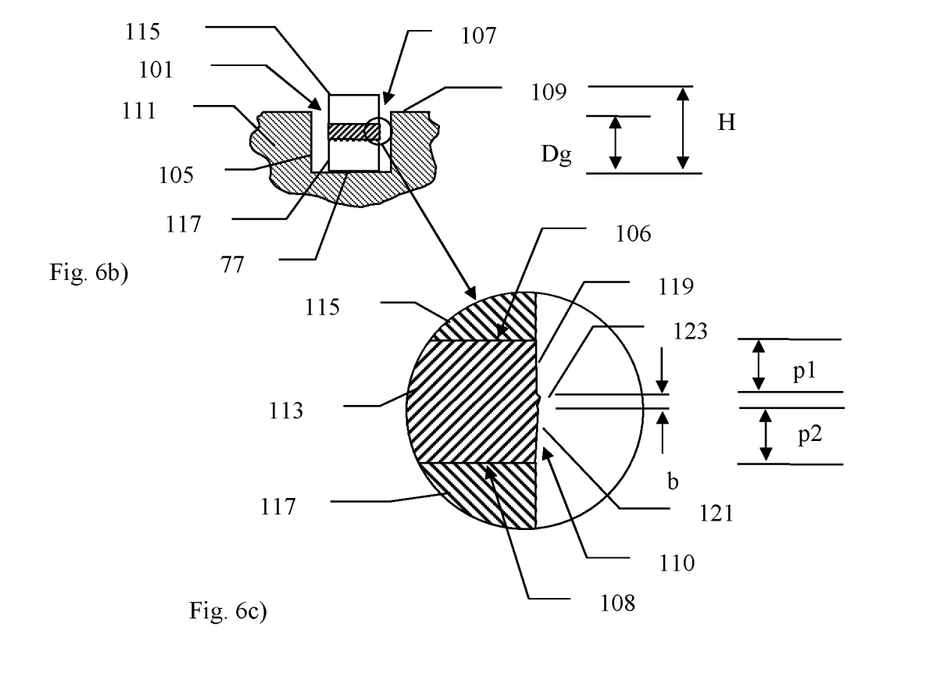

FIGS. 6a)-6c) show a stamped sealing device 101 formed using the above described method in accordance with the present invention. Sealing device 101 is shown positioned in a groove 107 with wall 105 formed in the mating surface 109 of a component 111. Sealing device 101 comprises a rigid substrate 113 with an upper major surface 106 and a lower major surface 108 separated by cut surfaces 110 and 110'. Preferably, cut surfaces 110 and 110' are separated by a distance which is equal to, or greater than, 1.0 mm and which is equal to, or less than, 5 mm. More preferably the cut surfaces are separated by a distance which is equal to, or greater than, 1.1 mm and which is equal to, or less than, 4 mm. Most preferably the cut surfaces are separated by a distance which is equal to, or greater than, 1.2 mm and which is equal to, or less than, 3 mm. An upper layer 115 of resilient material is attached to its upper major surface 106 and a lower layer 117 of resilient material is attached to its lower major surface 108. Unlike conventional stamped sealing devices with a rigid material layer in which the originally planar rigid material is deformed out of its original plane due to the unequal forces exerted on it by the stamping process, the upper major surface 106 and lower major surface 108 of sealing device 101 are parallel to each other i.e. the plane of upper major surface 106 and the plane of lower major surface 108 are parallel and are flat. Cut surfaces 110 and 110' are parallel with each other and the planes of cut surfaces 110 and 110' are perpendicular to the planes of major surfaces 106 and 108. This makes the sealing device easier to mount as it will not tend to twist out of the plane that it is to be mounted on and, because of the lack of shape variations due to the absence of warping, this also permits automated mounting of the sealing devices. Possible materials suitable for use as a rigid substrate include, but are not limited to, metals including aluminium and steel, composite materials and polymer-based materials.

Possible resilient materials include, but are not limited to:

Rubber polymers, NBR/PVC blends (Nitrile rubber/Polyvinyl chloride), CR, Chloroprene rubber, NBR/EPDM blends ((Nitrile rubber/Ethylene Propylene Diene rubber), NBR, Nitrile rubber, EPDM, Ethylene Propylene Diene rubber, Styrene-Butadiene (SBR), Natural Rubber, ACM, Acrylic rubber, BIIR, Bromo butyl rubber, BR, Butadiene rubber, CIIR, Chloro buryl rubber, CM, Chlorinated Polyethylene rubber, CSM, Chlorosulponated polyethylene rubber, ECO, Epichlorohydrin rubber, EPDM, Ethylene Propylene Diene rubber, FPM, Fluoro rubber, HNBR, Hydrogenated Nitrile rubber, IIR, Butyl rubber, IR, Isoprene rubber, MFQ, Fluoro-silicone rubber, NR, Natural rubber, PO, Propylene oxide rubber, Q, Silicone rubber, SBR, Styrene-butadiene rubber, U, Urethane rubber, AEM, TPE and the like, and combinations thereof.

These resilient materials may also be blended with reinforcement fibres and/or filler(s). The reinforcement fibres may be selected from organic fibres depending on the specific application. Examples of organic fibres include: aromatic polyamide fibres, polyamide fibres other than aromatic polyamide fibres, polyolefine fibres, polyester fibres, polyacrylonitrile fibres, polyvinyl alcohol fibres, polyvinylchloride fibres, polyurea fibres, polyurethane fibres, polyfluorocarbon fibres, phenol fibres, cellulosic fibres, or the like. In possible embodiment of the invention, the reinforcement fibres comprise cellulose fibers and/or aromatic polyamide fibers. In other possible embodiment of the invention inorganic fibres may be used such as mineral fibres and/or ceramic fibres and/or metal fibres.

As described above during the process of stamping sealing device 101 out of a blank the rigid substrate 113 has been cut by two cutting surfaces. FIG. 6c) shows an enlarged view of the exposed surfaces of the rigid substrate. As can be seen in FIG. 6c) the exposed cut surface of the rigid material has a smooth first burnished region 119 of height p1 and a smooth second burnished region 121 of height p2 separated by a rough breakout 123 of height b. Preferably heights p1 and p2 are the same to minimise warping of the material. However it is conceivable to have heights p1 and p2 which are different, for example if the rigid material does not have homogeneous properties throughout its depth. This could for example be due to a surface coating applied to one major face of the material. It could also be because the rigid material is made of layers of material with different properties or because the physical properties of the material vary throughout its depth, for example due to a hardening process applied to only one major surface. The height of rough breakout 123 is substantially the same as kissing distance K and thus b is preferably equal to or less than 0.2 mm, more preferably equal to or less than 0.03 mm and most preferably equal to or less than 0.01 mm. There is substantially no edge rollover. Upper burnish has been formed by the cutting surface of the first cutting tool and lower burnish has been formed by the cutting surface of the second cutting tool. The rough breakout is caused by the rigid material that remains between the two burnishes fracturing. This fracturing can occur either during the cutting process or in a subsequent operation (e.g. a subsequent press operation or bending operation).

One advantage of the present invention is that it provides the possibility to cut composite material into shape using just a single cutting operation without the requirement for further treatments. This is more cost efficient than other possible cutting techniques. A further advantage of the present invention is that it makes it possible to reliably and consistently cut material having a post-cut width (wherein the "width" is the maximum distance between the exposed cut sides of the sealing device) of 3 mm or less without any significant deformation of the material and without prematurely wearing out the cutting tools. Further advantages achieved by the present invention include some or all of the following:

the precision cutting of the material and the resulting limited deformation, absence of, or greatly reduced, edge rollover, and the limited breakout area mean that the manufacturing precision is high and it is possible to achieve very high geometric tolerances;

the cut edges are substantially straight;

no heat is used in the cutting operation and therefore the properties of the materials are not affected;

no flash or swarf is produced in the cutting operation.

The sealing devices are stiffer than conventional O-rings or other rubber profiles such as moulded seals or "press in place seals" and therefore easier to fit than these as they are shape stable; and, the sealing devices can be mounted on a ledge or shelf or flat surface (i.e they only need to be supported by one surface instead of requiring a groove which is usually necessary to support and hold in position prior art rubber seals.

Figure 7:
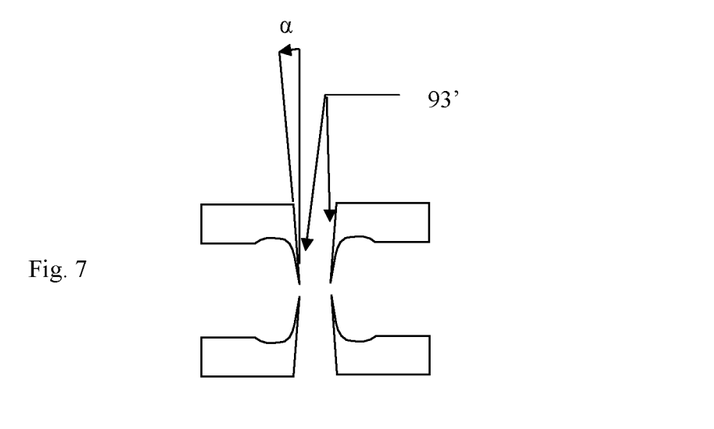
FIG. 7 shows schematically a cross-section through a set of punches in accordance with a further embodiment of the invention.

FIG. 7 shows schematically a cross-section through a set of punches in accordance with a further embodiment of the invention. In contrast to the previous embodiment of the invention in which the flat faces of the cutting blades are parallel with each other, it is also possible for the inner faces 93' of the blades to be angled away to or from each other by an angle (in this case 2α) to change friction as they cut as shown here in FIG. 7.

While the invention has been illustrated by an example of a simple linear stamping apparatus, it is conceivable to use the concept of press cutting from opposed sides of a blank in all other types of suitable presses, for example, eccentric presses, screw presses, rotational presses, hydraulic presses, etc. Furthermore, although the invention has been illustrated by an example of a sealing device in the form of a continuous strand or loop with two cut surfaces—one on the inside of the loop and one on the outside, it is also possible to produce a stamped sealing device with a single cut surface, i.e. around the periphery of the sealing device.

Sealing devices in accordance with the present invention may, among other things, replace compression or injection moulded seals made from solid rubber ("spaghetti gaskets") or polymers where sealing functions are required. Possible areas of application include seals for use in industrial, electrical, transportation, marine, aviation, etc. products. Typical applications could be seals for housings, motor and gearbox oil pans, blocks, sealing covers, lids and the like.

The above described constructions, apparatus and methods are for illustrative purposes only and are not intended to limit the scope of the following claims.

What is claimed:

1. Stamped sealing device comprising a rigid substrate with two substantially parallel major surfaces (106, 108) characterized that in said major surfaces are separated by two substantially parallel cut surfaces, wherein each said cut surface (110) comprises a first burnished region (119) of height pi and a second burnished region (121) of height p2 wherein the respective first and second burnished regions of each cut surface are parallel and aligned with each other and separated by a rough breakout (123) of height b, and perpendicular to the two major surfaces, wherein said rough breakout is free from contact with surrounding materials.

2. Sealing device according to claim 1 wherein the height b of said rough breakout is equal to or less than 0.2 mm, more preferably equal to or less than 0.03mm and most preferably equal to or less than 0.01 mm.

3. Sealing device according to claim 1 characterised in that said substrate is covered on at least one of said major surfaces with a resilient material.

4. Sealing device according to claim 1 characterised in that said substrate is covered on both of said major surfaces with a resilient material.

5. Sealing device according to claim 1 characterised in that said cut surfaces are separated by a distance which is greater than, or equal to, 1.0 mm and which is less than, or equal to, 5 mm.

6. Sealing device according to claim 1 characterised in that said cut surfaces are separated by a distance which is greater than, or equal to, 1.1 mm and which is less than, or equal to, 4 mm.

7. Sealing device according to claim 1 characterised in that said cut surfaces are separated by a distance which is greater than, or equal to, 1.2 mm and which is less than, or equal to, 3 mm.

8. Sealing device in accordance with claim 1 characterised in that height p1 and height p2 are equal.

* * * * *

UNITED STATES PATENT AND TRADEMARK OFFICE
CERTIFICATE OF CORRECTION

PATENT NO. : 10,001,215 B2
APPLICATION NO. : 14/384761
DATED : June 19, 2018
INVENTOR(S) : Sven Haglund and Jonas Andersson It is certified that error appears in the above-identified patent and that said Letters Patent is hereby corrected as shown below:

In the Claims

Column 10; Line 48 please amend:
"height pi and a second burnished region (121) of height p2"
To:
--height p1 and a second burnished region (121) of height p2--

Signed and Sealed this
Twentieth Day of November, 2018

Andrei Iancu
*Director of the United States Patent and Trademark Office*